(No Model.)
A. CHRISTENSEN.
ENDLESS BELT.
No. 606,376. Patented June 28, 1898.
Fig. 1.
Fig. 2.
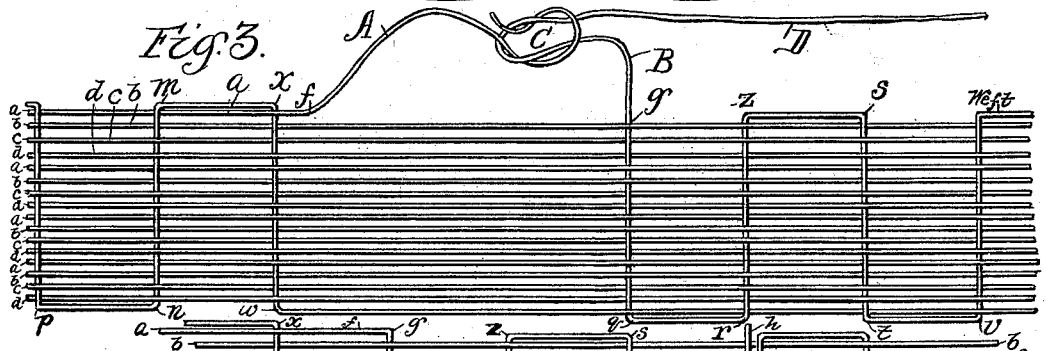
Fig. 3.
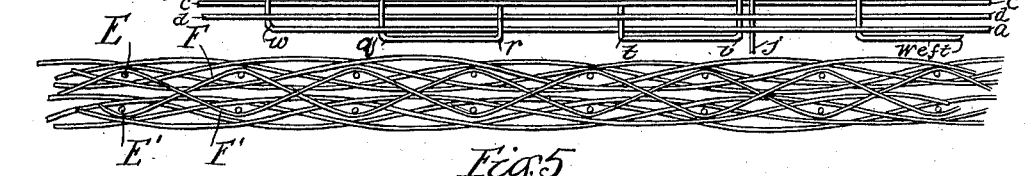
Fig. 4.
Fig. 5.
Witnesses.
Wm. M. Rheem.
N. H. Humphrey
Inventor.
Anthon Christensen
by Brown & Darby
Att'ys

UNITED STATES PATENT OFFICE.

ANTHON CHRISTENSEN, OF CHICAGO, ILLINOIS, ASSIGNOR, BY MESNE ASSIGNMENTS, TO THE ANTHON CHRISTENSEN BELTING COMPANY, OF SAME PLACE.

ENDLESS BELT.

SPECIFICATION forming part of Letters Patent No. 606,376, dated June 28, 1898.

Application filed September 30, 1897. Serial No. 653,581. (No model.)

*To all whom it may concern:*

Be it known that I, ANTHON CHRISTENSEN, a subject of the King of Denmark, residing at Chicago, in the county of Cook and State of Illinois, have invented a new and useful Endless Belt for Power Transmission, of which the following is a specification.

This invention relates to endless belts for power transmission.

The object of the invention is to produce a flat endless belt for power transmission of novel construction and arrangement, simple, efficient, and durable.

The invention consists, substantially, in the construction, combination, location, and arrangement, all as will be more fully hereinafter set forth, as shown in the accompanying drawings, and finally specifically pointed out in the appended claims.

Referring to the accompanying drawings and the various views and reference-signs appearing thereon, Figure 1 is a longitudinal sectional view of an endless belt, illustrating the manner of constructing the same, the space between the threads or cords composing the belt being distorted for the sake of convenience of illustration. Fig. 2 is a similar view of a portion thereof enlarged. Fig. 3 is an enlarged plan view of a portion of a belt constructed in accordance with the invention, illustrating the manner of forming the same. Fig. 4 is a similar view illustrating the manner of finishing the weaving operation. Fig. 5 is an enlarged broken longitudinal sectional view illustrating a double or two-ply belt embodying the principles of my invention.

In producing an endless flat belt H for power transmission in accordance with the principles of my invention I take a continuous thread or cord A, and beginning at a point— say, for instance, $f$—I wind the same into a plurality of convolutions over a suitable frame or support, the end portions of which are spaced a distance apart sufficient to produce an endless belt of the desired length—that is to say, the length of the convolute loops should be substantially the same as the length of the endless belt to be produced. This is accomplished by forming the convolute loops or strands $a\ b\ c\ d, a\ b\ c\ d$, and so on, of the desired number to produce a belt of the desired or required width. In the particular form shown, to which, however, my invention is not limited or restricted, I form sixteen of such loops. These strands or loops constitute the warp threads or cords of the belt and are formed from a continuous thread or cord. When the desired number of warp-strands are thus formed, the end of such warp strand or thread $a$, (shown at the bottom of Fig. 3,) is then woven from the point $w$ transversely through the warp-strands by passing the same under the wrap-strand $d$, over warp-strands $c\ b$, under warp-strands $a\ d$, over the warp-strands $c\ b$, and so on under two and over two of the warp-strands, finally passing under the starting warp strand, thread, or cord $a$ at the point $x$, thus forming the loop, and again passing transversely of the warp-threads from the point $m$, similarly over the initial warp-strand $a$, over the next adjacent strand $b$, then under strands $c\ d$, then over the next two adjacent warp-strands, and so on, finally emerging at the point $n$ under the warp-strand $d$, thus forming the loop, and passing transversely of the warp-strands from the point $p$ in the opposite direction, first passing over strand $d$, thence under the next two, and so on across. This weaving is continued, the transverse or weft portion being passed across or transverse the warp-strands and passing alternately under two and over two of the warp-threads in such manner that the warp threads or cords similarly pass alternately under and over two of the weft portions. This weaving operation is continued around the loops formed by the warp-threads until finally the point $g$, Fig. 3, is reached and as close to the starting-point as is possible or practicable. It now becomes necessary to finish up the belt, still retaining the continuous character of the strand or thread from which the endless belt is made, it being understood, of course, that the length of such continuous strand or thread may be increased, when required, by securing to the end thereof when a ball of the thread or cord is exhausted the end of a fresh ball of the thread or cord. I will therefore now describe the finishing steps, particular reference being had to Figs. 3 and 4. When the weaving has been completed, as before described, to the point $g$, which is as close to the starting-point $f$ as is practicable, the end B of the weft-strand is then secured in any suitable or convenient manner, as indicated at C, to the starting end A, the portion B being extended for a considerable comparative length, as indicated at D. The knot or splice C should be neatly made, so as not to oppose any unusual interference to the passage of the same through and between the warp-strands $a\ b\ c\ d$, &c. The space between the starting-point $f$ and the ending-point $g$, as above indicated, is now filled up in the following manner: The loop of the weft-strand between the points $q\ r$ is now increased by drawing the ends B, D, and A, together with the knot C, over the warp-strands $a\ b\ c\ d$, &c., and by thus loosening the weft-strand between the points $g\ q$ the same is gradually worked by hand until the point $g$, Fig. 3, is worked down into position shown in Fig. 4 and is drawn tight. At this point it will be understood that the extended loop portion formed by the ends A B will now be accommodated between the points $q\ r$, the knot C and the end D having been drawn over the warp-threads. The next step will be to extend the loop of the weft-thread between the point $z\ s$ and working the portion of the weft extending between the points $z\ r$, as shown in Fig. 3, down to the position thereof as shown in Fig. 4, and hence drawing the loop $q\ r$ tight, thus filling up the entire portion of the space originally left between the points $f\ g$ of Fig. 3 and again drawing the ends A B D and the knot C over the warp-threads. This operation is continued in the same manner a sufficient distance back along the woven belt until finally the loop portion formed by the ends A B D and the knot C occupies the position between the points $t\ v$—that is to say, until the space between the starting-point $f$ and the ending-point $g$, Fig. 3, has been evenly filled up by gradually working down the weft portions previously applied to the warps in the manner above described and the end A has been very nearly exhausted. From the point $v$ the loose end D is held, while the end A and the knot C are again passed transversely through the warp-threads, the knot or splice C untied, and the projecting ends $h\ j$ are then cut off at a point close up to the sides of the finished belt.

From the foregoing description it will be seen that the final ends $h\ j$ constitute the two ends of the continuous thread or cord from which the entire belt is woven. It will also be seen that these two ends $h\ j$ occupy the same relative position with respect to the warp-threads and are efficiently held without danger of unraveling or of being detected when said ends are cut off close up to the sides or edges of the finished belt. If desired, however, the end $j$ may be doubled along the loop portion extending from $v$ to $t$, thence to $s$, and so on. This may be readily accomplished by employing the extended portion D, as will be readily seen by persons skilled in the art. Usually, however, one doublet of the ends $h\ j$, as shown in Fig. 4, will be sufficient.

The principle above described may be applied with equal facility in the production of a double or two-ply belt—such, for instance, as is shown in Fig. 5—formed from a single continuous unbroken thread or cord. This construction is produced by first winding on the frame or other support from a continuous thread or cord a sufficient number of loops or convolutions corresponding to the width of the belt to be produced and then applying to that layer of convolutions a superimposed layer of an equal number of convolutions. I then arrange between suitable and regular sets—say, for instance, four upper and four lower strands of convolutions—two additional strands F F' and parallel therewith. I now begin to weave identically in the manner above described, employing the outside warp-strand to begin the weft portions, the first transverse passage of the weft portion (indicated at E, Fig. 5) arranged to pass under one member F' of each pair of the additional or auxiliary strands F F' and also between the members of the upper layer of convolutions in a manner substantially as above described with reference to the construction shown in Figs. 2, 3, and 4. After completing this transverse passage E, I pass the end thereof transversely across the warp-strands of the lower convolutions or strands or warp-threads, as indicated at E', Fig. 5, and arrange the same to pass under the coöperating member of each pair of additional threads F F', as clearly shown in Fig. 5, the passage of the weft E' through the warp-threads of the inner convolution of the warps being identical with that above described with reference to the construction and arrangement shown in Figs. 2, 3, and 4. The weft is then passed in the same way transversely across the warp-threads of the upper convolution in the same manner and back through the warp-threads of the lower convolutions, and so on. Each passage through the warp-threads of the upper layer the weft portion passes under the additional or securing strands F F', and each passage of the weft portion through the warp-strands of the lower or inner layer of warp-threads passing under the attaching or securing threads F or F'. The belt is finally finished in the manner above described. Thus it will be seen that a double or two-ply belt is produced which is formed from a continuous unbroken thread or cord. It will also be seen that the attaching or securing threads or cords F F' are maintained beneath the upper and above the under surface of the belt and are hence hidden from view without disturbing the symmetry of the belt.

From the foregoing description it will be seen that I produce an endless flat belt for power transmission from a single continuous strand, thread, or cord.

While I have found that cotton thread or cord is particularly well adapted for use in carrying out my invention, I do not desire to be limited or restricted to the use of any particular material, as other materials besides cotton may be found to be useful or desirable as a material from which belts may be made.

Having now set forth the object and nature of my invention and the method and operation of carrying the same into practical effect, what I claim as new and useful and of my own invention, and desire to secure by Letters Patent of the United States, is—

1. As a new article of manufacture, an endless belt or band for power transmission formed from a continuous strand formed into parallel, longitudinal loops of a length corresponding to the length of the belt to be produced and the end of the outer convolution being woven transversely back and forth through and between the intermediate convolutions after the manner of a weft, the ends of said strand finally passing transversely through the body of the belt in opposite directions and in proximity to each other and in the same relation to the longitudinal strands, as and for the purpose set forth.

2. As a new article of manufacture, an endless flat belt or band for power transmission formed from a continuous strand and comprising superimposed layers of longitudinal loops or convolutions, the ends of said strands being alternately woven through and transversely across the portions of the upper convolutions and the lower convolutions, and additional securing threads or strands, said transverse portions being arranged to pass alternately under and over said additional strands, as and for the purpose set forth.

In witness whereof I have hereunto set my hand, this 9th day of September, 1897, in the presence of the subscribing witnesses.

ANTHON CHRISTENSEN.

Witnesses:
  JOHN McNALLY,
  WM. WALKER.